(12) United States Patent
Kneuper (10) Patent No.: US 10,005,562 B2
(45) Date of Patent: Jun. 26, 2018

(54) STANDBY INSTRUMENT PANEL FOR AIRCRAFT

(71) Applicant: Textron Innovations Inc., Providence, RI (US)

(72) Inventor: Jeremy Joseph Kneuper, Hesston, KS (US)

(73) Assignee: Textron Innovations Inc., Providence, RI (US)

( * ) Notice: Subject to any disclaimer, the term of this patent is extended or adjusted under 35 U.S.C. 154(b) by 206 days.

(21) Appl. No.: 14/642,032

(22) Filed: Mar. 9, 2015

(65) Prior Publication Data

US 2015/0262545 A1    Sep. 17, 2015

Related U.S. Application Data (60) Provisional application No. 61/951,145, filed on Mar. 11, 2014, provisional application No. 61/951,189, filed on Mar. 11, 2014, provisional application No. 61/951,260, filed on Mar. 11, 2014, provisional application No. 61/951,231, filed on Mar. 11, 2014, provisional application No. 61/951,240, filed on Mar. 11, 2014, provisional application No. 61/951,243,
(Continued)

(51) Int. Cl.
| | |
|---|---|
| *B64D 43/00* | (2006.01) |
| *G01C 23/00* | (2006.01) |
| *G09G 5/14* | (2006.01) |
| *G06F 3/0488* | (2013.01) |

(52) U.S. Cl.
CPC ............ *B64D 43/00* (2013.01); *G01C 23/00* (2013.01); *G06F 3/0488* (2013.01); *G09G 5/14* (2013.01); *G06F 2203/04804* (2013.01); *G09G 2340/10* (2013.01); *G09G 2340/12* (2013.01); *G09G 2380/12* (2013.01)

(58) Field of Classification Search
None
See application file for complete search history.

(56) References Cited

U.S. PATENT DOCUMENTS

| | | |
|---|---|---|
| 5,272,652 A | 12/1993 | Rosenshein et al. |
| 6,636,786 B2 | 10/2003 | Partel |
| (Continued) | | |

FOREIGN PATENT DOCUMENTS

| | | |
|---|---|---|
| EP | 2623935 A1 | 7/2013 |
| WO | 2011128835 A2 | 10/2011 |

OTHER PUBLICATIONS

U.S. Appl. No. 14/643,510, Office Action dated Feb. 18, 2016, 24 pages.
(Continued)

*Primary Examiner* — Christopher Kohlman
(74) *Attorney, Agent, or Firm* — Erise IP, P.A.

(57) ABSTRACT

A system and method for displaying standby instrument information is disclosed. The touch-screen instrument panel system for a vehicle has a touch-screen information panel display configured to display vehicle operation information received from a computing system and a standby instrument display that is secured to an area located behind the information panel display. The standby instrument display is hidden from view when the information panel display is in a powered state but is in full view when the information panel display is in an unpowered state.

18 Claims, 4 Drawing Sheets

Related U.S. Application Data filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014, provisional application No. 61/951,248, filed on Mar. 11, 2014.

(56) References Cited

U.S. PATENT DOCUMENTS

| | | | |
|---|---|---|---|
| 6,687,578 B2 | 2/2004 | Lehman et al. | |
| 7,262,707 B2 | 8/2007 | Kaoh | |
| 7,382,288 B1 | 6/2008 | Wilson et al. | |
| 7,420,476 B2 | 9/2008 | Stiffler | |
| 7,928,863 B2 | 4/2011 | Firra | |
| 8,497,784 B1 | 7/2013 | Vandrovec | |
| 8,515,658 B1 | 8/2013 | Foster et al. | |
| 8,554,457 B2 | 10/2013 | White et al. | |
| 8,570,192 B2 | 10/2013 | McLoughlin et al. | |
| 8,633,913 B1 | 1/2014 | Raghu et al. | |
| 8,660,718 B2 | 2/2014 | Holder | |
| 9,245,242 B2 | 1/2016 | Arnold et al. | |
| 9,302,780 B2 | 4/2016 | Zaneboni et al. | |
| 9,478,140 B2 | 10/2016 | Kathirvel et al. | |
| 2001/0035832 A1 | 11/2001 | Block | |
| 2003/0078704 A1 | 4/2003 | Partel | |
| 2003/0156046 A1 | 8/2003 | Dwyer | |
| 2004/0140959 A1 | 7/2004 | Matsumura et al. | |
| 2004/0236481 A1 | 11/2004 | Saint-Aroman et al. | |
| 2006/0164261 A1 | 7/2006 | Stiffler | |
| 2006/0238402 A1 | 10/2006 | Khatwa | |
| 2007/0164168 A1* | 7/2007 | Hirvonen | B64C 13/04 244/223 |
| 2008/0012730 A1* | 1/2008 | Soler | G01C 23/00 340/973 |
| 2009/0112380 A1 | 4/2009 | Nutaro et al. | |
| 2009/0238378 A1 | 9/2009 | Kikinis et al. | |
| 2009/0326744 A1 | 12/2009 | He et al. | |
| 2010/0127847 A1 | 5/2010 | Evans et al. | |
| 2010/0141482 A1 | 6/2010 | Wyatt et al. | |
| 2010/0156809 A1 | 6/2010 | Nutaro et al. | |
| 2010/0194602 A1 | 8/2010 | Engels et al. | |
| 2010/0211237 A1 | 8/2010 | Nichols et al. | |
| 2010/0231418 A1 | 9/2010 | Whitlow et al. | |
| 2010/0250030 A1 | 9/2010 | Nichols et al. | |
| 2010/0253671 A1* | 10/2010 | Perry | G06F 1/1633 345/212 |
| 2010/0262318 A1 | 10/2010 | Ariens | |
| 2010/0265268 A1 | 10/2010 | Wilson et al. | |
| 2010/0283635 A1 | 11/2010 | Brinkman et al. | |
| 2011/0025530 A1 | 2/2011 | He | |
| 2011/0066362 A1 | 3/2011 | He | |
| 2011/0193694 A1 | 4/2011 | Bowden et al. | |
| 2011/0196598 A1 | 8/2011 | Feyereisen et al. | |
| 2011/0241901 A1 | 10/2011 | Firra | |
| 2011/0313597 A1 | 12/2011 | Wilson et al. | |
| 2012/0026190 A1 | 2/2012 | He et al. | |
| 2012/0035849 A1 | 2/2012 | Clark et al. | |
| 2012/0105335 A1 | 5/2012 | Suddreth et al. | |
| 2012/0110517 A1* | 5/2012 | Sparks | G06F 3/0482 715/863 |
| 2012/0215433 A1 | 8/2012 | Subbu et al. | |
| 2013/0006511 A1 | 1/2013 | Ramaiah et al. | |
| 2013/0027226 A1 | 1/2013 | Cabos | |
| 2013/0076540 A1 | 3/2013 | McLoughlin et al. | |
| 2013/0135328 A1* | 5/2013 | Rappoport | G06F 3/0481 345/522 |
| 2013/0162632 A1 | 6/2013 | Varga et al. | |
| 2013/0231804 A1 | 9/2013 | Servantie et al. | |
| 2013/0245860 A1 | 9/2013 | Cooper | |
| 2013/0249814 A1 | 9/2013 | Zeng | |
| 2013/0314328 A1 | 11/2013 | Singer | |
| 2014/0053101 A1 | 2/2014 | Buehler et al. | |
| 2014/0172204 A1 | 6/2014 | Coulmeau et al. | |
| 2014/0180508 A1* | 6/2014 | Zaneboni | B64D 45/00 701/14 |
| 2014/0285661 A1 | 9/2014 | Feyereisen et al. | |
| 2014/0300508 A1 | 10/2014 | Booher et al. | |
| 2014/0300555 A1 | 10/2014 | Rogers | |
| 2014/0309821 A1 | 10/2014 | Poux et al. | |
| 2014/0335797 A1 | 11/2014 | Cooper | |
| 2014/0347197 A1 | 11/2014 | Boomgarden et al. | |
| 2015/0004374 A1 | 1/2015 | Kneuper et al. | |
| 2015/0015698 A1 | 1/2015 | Knight | |
| 2015/0210388 A1 | 7/2015 | Criado et al. | |
| 2015/0262545 A1 | 9/2015 | Kneuper et al. | |
| 2015/0352952 A1 | 12/2015 | Kneuper et al. | |
| 2016/0049080 A1 | 2/2016 | Bazawada et al. | |

OTHER PUBLICATIONS

International Search Report and Written Opinion issued in PCT/US2015/019459, dated Jun. 23, 2015, 12 pages.

Mangion, D., et al., "A Single Interactive Display Concept for Commercial and Business Jet Cockpits," 11th AIAA Aviation Technology, Integration and Operations (AIIO) Conference, Virginia Beach, VA, Sep. 2011.

* cited by examiner

FIG. 4

STANDBY INSTRUMENT PANEL FOR AIRCRAFT

CROSS-REFERENCE TO RELATED APPLICATIONS

This application claims the benefit of U.S. Provisional Application No. 61/951,145, entitled "3D Weather", U.S. Provisional Application No. 61/951,189, entitled "HD Camera", U.S. Provisional Application No. 61/951,260, entitled "Adjustable Synthetic Vision System", U.S. Provisional Application No. 61/951,231, entitled "Skytrak Navigational Aid", U.S. Provisional Application No. 61/951,240, entitled "Smart Airport Application", U.S. Provisional Application No. 61/951,243, entitled "Smart Traffic Application", U.S. Provisional Application No. 61/951,157, entitled "Chart Synoptic Window", U.S. Provisional Application No. 61/951,168 entitled "Flight Planning Synoptic Window", U.S. Provisional Application No. 61/951,201 entitled "Intelligent Radio Frequency Identifiers", U.S. Provisional Application No. 61/951,152, entitled "Crew Alerting System", U.S. Provisional Application No. 61/951,195 entitled "Historical Data Feature", U.S. Provisional Application No. 61/951,208 entitled "Maintenance Synoptic Window", U.S. Provisional Application No. 61/951,220 entitled "Master Warning/Master Caution", U.S. Provisional Application No. 61/951,234 entitled "Proximity Icon", U.S. Provisional Application No. 61/951,166 entitled "Flight Control Synoptic Window", U.S. Provisional Application No. 61/951,215 entitled "Mode Controller and Engine Indication Icon", U.S. Provisional Application No. 61/951,253 entitled "Synoptic Window Layout", U.S. Provisional Application No. 61/951,216 entitled "Moveable Synoptic Pages", U.S. Provisional Application No. 61/951,223 entitled "Pinnable Synoptic Pages", and U.S. Provisional Application No. 61/951,248 entitled "Standby Instrument Panel", all filed Mar. 11, 2014. The entireties of each of the aforementioned applications are incorporated by reference herein.

BACKGROUND

Standby instruments are required navigational equipment for all aircraft to prevent potentially catastrophic consequences of a failure of the main navigational equipment, which includes instruments for providing primary flight information ("PFI") to the pilots. PFI refers to those functions that are required by the airworthiness and operational rules, and include airspeed, altitude, attitude, and heading (direction). Standby instruments ensure that PFI is available to the pilot during all phases of flight, and it is required that these instruments provide the pilot with attitude, altitude, and airspeed information after failure of any of the aircraft's main power systems. It is the object of most flights to not have to use the standby instruments.

Electronic displays incorporated into aircraft cockpits are intended to improve cockpit situational awareness by streamlining how information is provided to pilots. However, access to the standby instruments must always be available, which has heretofore prevented a transition to a single electronic display accessible by all members of the flight crew. Thus, traditional electronic displays provide a piecemeal approach to information display.

SUMMARY

The following presents a simplified summary of the invention in order to provide a basic understanding of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, an instrument panel system for a vehicle is disclosed that includes a touch-screen display. The display interfaces with vehicle systems through a computing system, and a standby instrument is secured behind it so that it faces the back of the information panel display. If there is power to the display, the standby instrument is at least partially hidden from view, but when power is lost, the standby instrument becomes viewable through the display. In embodiments, the panel is an OLED display. In some embodiments, the system is incorporated into the cockpit of an aircraft.

A method is also disclosed where a display panel in a vehicle is active in a first state, and becomes more transparent when put into a second state. The instrument is secured behind the panel, and is oriented in such a way that it can be observed and information learned from the instrument when the panel is in the second state (making it more transparent). The second state can be created by either an interruption in power, or based on a selection by a user. In some embodiments, the vehicle is an aircraft and wherein the panel enables interfacing with at least one mechanical or one electrical system in the aircraft.

In other aspects, the method involves locating the panel in an aircraft cockpit and causing the panel to laterally extend such that the panel spans a substantial portion of the width of the cockpit.

In another aircraft system embodiment, the system includes an interactive display panel constructed of an organic semiconductor which is sandwiched between two electrodes. The display panel has transparency when power is lost, and a backup device is located behind the display panel. The backup device is oriented such that when power is lost, the backup device is readable through the display panel. The backup device can be centrally located, and can be an instrument that reads attitude, altitude, and airspeed. In other embodiments, the display panel is a touch screen and is arranged through a computer system to interface with a plurality of aircraft systems. Further, the display panel substantially takes the place of a plurality of controls utilized to interact with said plurality of aircraft systems.

DETAILED DESCRIPTION

Systems for providing backup instrument readings in conjunction with the display of real-time images in the cockpit of an aircraft are described herein. In embodiments, the system 100 includes a secondary instrument panel 320 provided behind a touch-screen instrument panel (TSIP) 130 located in the cockpit of an aircraft.

Figure 1:
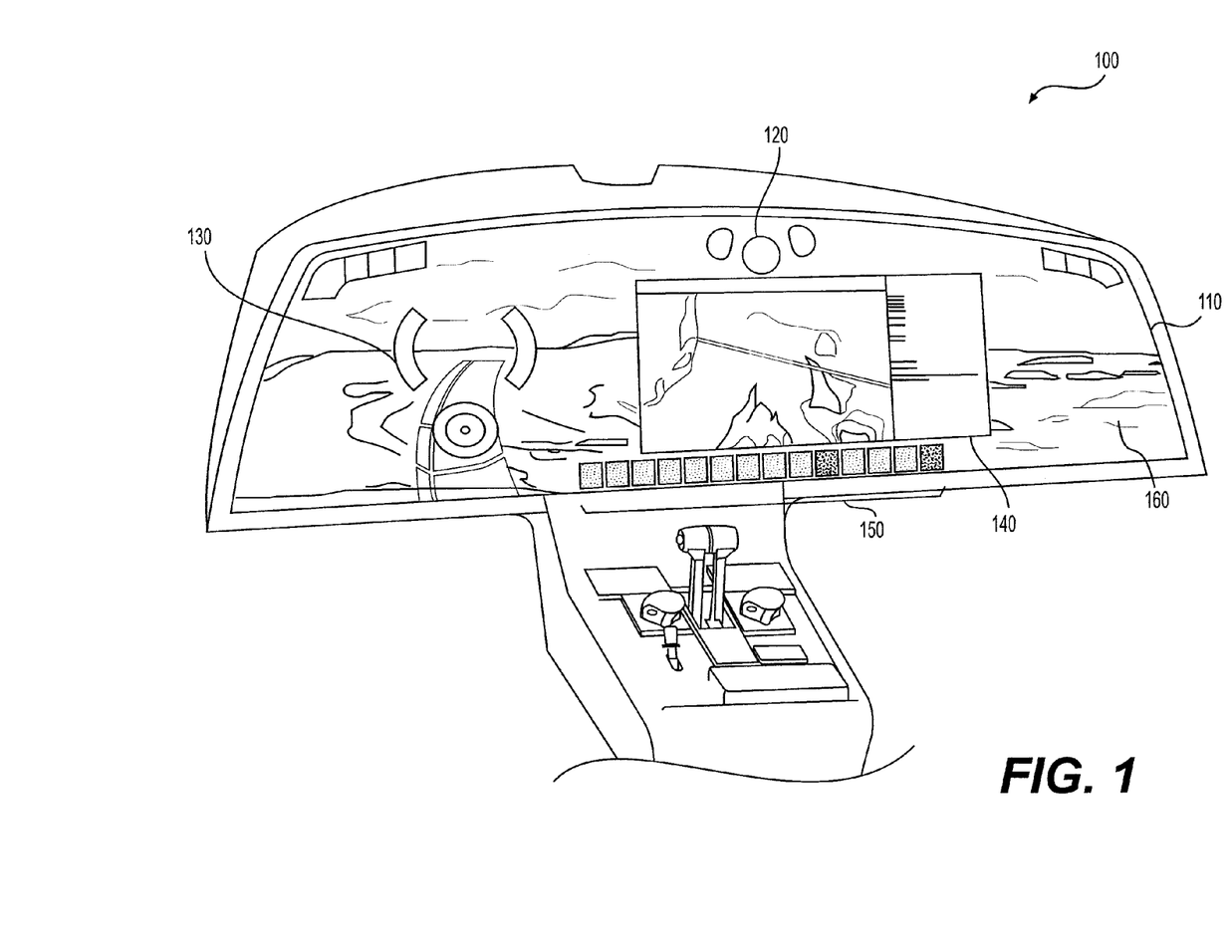
FIG. 1 is a perspective view of a touch-screen instrument panel system for an aircraft in accordance with an embodiment of the present invention.

FIG. 1 illustrates an embodiment of a TSIP. The TSIP replaces the plurality of instruments typically located in an aircraft cockpit, including dials, gauges, and screens that would traditionally be located on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed simultaneously by anyone present in the cockpit (e.g., the pilot and co-pilot).

The TSIP is a digital information panel that may include a plurality of digital layers. The digital layers may overlay one another to create multiple views. For instance, and as will be described in further detail below, one layer may be a real-time view while another layer may be a three-dimensional representation of, for example, weather; yet another layer may include flight instruments and may not be obstructed with any other layers or representations. A processor, similar to that of onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, and as discussed in detail below, the TSIP may be configured such that, in the event of a failure or malfunction of the TSIP, each digital layer is cleared so that the standby instrument panel is available to the pilots.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users has easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather user interface panel. The menu 150 may also include a charts indicator to access various charts. Any feature that may be accessed via the TSIP may be represented in the menu 150. Various features will be described herein and in several of the applications related by subject matter, referenced above, which are herein incorporated by reference in their entireties.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
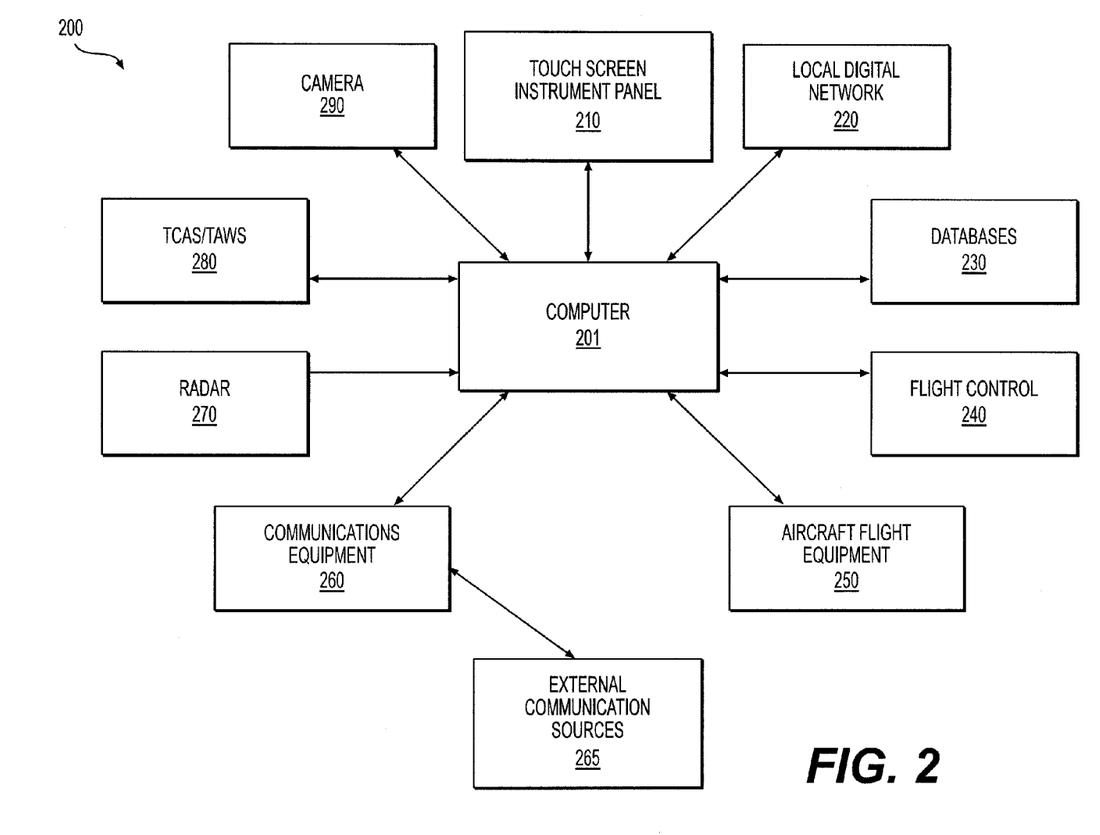
FIG. 2 is a system diagram of a touch-screen instrument panel system for an aircraft in accordance with an embodiment of the present invention.

FIG. 2 provides an embodiment of a system environment 200 including an aircraft touch-screen instrument panel (TSIP) 210. System environment 200 has a network of subsystems that includes an on-board computer 201, the TSIP itself 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processors provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as corners. In an embodiment, substrate has a large aspect ratio for providing images. Display is for example an organic light-emitting diode (OLED) display, which is thin and flexible for layering onto substrate. When unpowered, display is, in embodiments, transparent. Touch membrane is a thin, transparent and flexible material that is layered onto display and capable of sensing touch. Touch membrane is for example a resistive, capacitive, optical, or infrared touch screen. Together, touch membrane and display provide TSIP 210 with a visual display that a user may control by touching with one or more fingers or a stylus.

As used herein, the words transparent and/or translucent mean that the material from which it is constructed are able to be seen through to some degree. In other words, the TSIP display 110 possesses transparency or translucency when items located on one side of the display 110 can be seen through the display 110 on the other side. Therefore, the display 110 does not have to be completely transparent, or even substantially transparent, in order to possess transparency or translucency in accordance with the invention.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists. Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, deicing equipment, lights, and sensors (e.g., temperature, pressure, electrical). Aircraft flight equipment 250 is monitored and controlled by pilots using TSIP 210 through computer 201 for flying aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with, for example, radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and Internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible light as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Regardless, camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the condition of the aircraft, meaning that the user interface components provide an intuitive, broad view of the aircraft, its various components and subsystems, and their condition. The user interface utilizes the touch screen functionality of the TSIP 210 to present views of the aircraft to intuitively communicate information and accept input from the pilot. The views of the aircraft incorporate graphical, textual, and numerical elements to simultaneously convey multiple pieces of information to the pilot. The graphical, textual, and numerical elements of the user interface may flash, change color, change content, appear, disappear, move or change location, or otherwise change in response to user input or the state of the aircraft systems.

The TSIP 210 monitors the aircraft's data busses to determine the positions, temperatures, pressures, and states of various equipment and systems of the aircraft. The TSIP graphically displays the data gleaned from the busses in the appropriate synoptic panels or windows for flight crew interaction. The inventive user interface provides a thorough, easily understood, intuitive and user-friendly interaction with each synoptic user interface. The touch screen functionality of the TSIP 210 also allows the user to activate aircraft systems and change configuration settings through user interface displayed on the TSIP 210.

The user interface may provide for a variety of user interface elements grouped into a variety of "windows", which may also be referred to as "panels" or "pages". Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on the TSIP 210.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration. Active controls may be updated automatically by the system to display the current aircraft configuration, but are also capable of interacting with the user via the TSIP 210 to receive pilot input.

As previously mentioned, the present invention is directed to providing a synthetic vision system (SVS) display in combination with the TSIP. SVS have been used in aircraft for quite some time to improve situational awareness. However, the synthetic vision enhancements were either applied entirely or not at all. SVS are not currently available in a gradient-type application. In other words, synthetic vision enhancements cannot be applied to a real-time image to achieve an image that is a combination of a real-time image and a synthetic vision enhancement. For example, rather than turning the SVS on and viewing a 100% synthetic image, a user could, utilizing the present invention, indicate that a synthetic vision enhancement should be applied according to a synthetic vision application value. A synthetic vision application value, as used herein, refers generally to a numerical value with which to apply a synthetic vision enhancement. In embodiments, the synthetic vision application value is a percentage value. In additional embodiments, the synthetic vision application value is a percentage value less than 100% to achieve a combination of a synthetically enhanced image and the real-time original image.

As described herein, the TSIP 110 is configured to replace many, if not all, of the instruments in a traditional cockpit. However, in the event of an electrical malfunction, backup instruments must be available to the pilot and/or co-pilot to continue safe operation of the aircraft. Specifically, FAA guidelines in conjunction with Title 14, part 23 of the Code of Federal Regulations require that electronic displays not inhibit the primary displays of attitude, airspeed, and altitude remain uninhibited during normal modes of operation. (14 C.F.R. § 23.1311(a)(3)). According to FAA guidelines AC 23.1311-1C, standby displays of altitude, attitude, and airspeed must be available after failure of any electronic instrument display.

Figure 3:
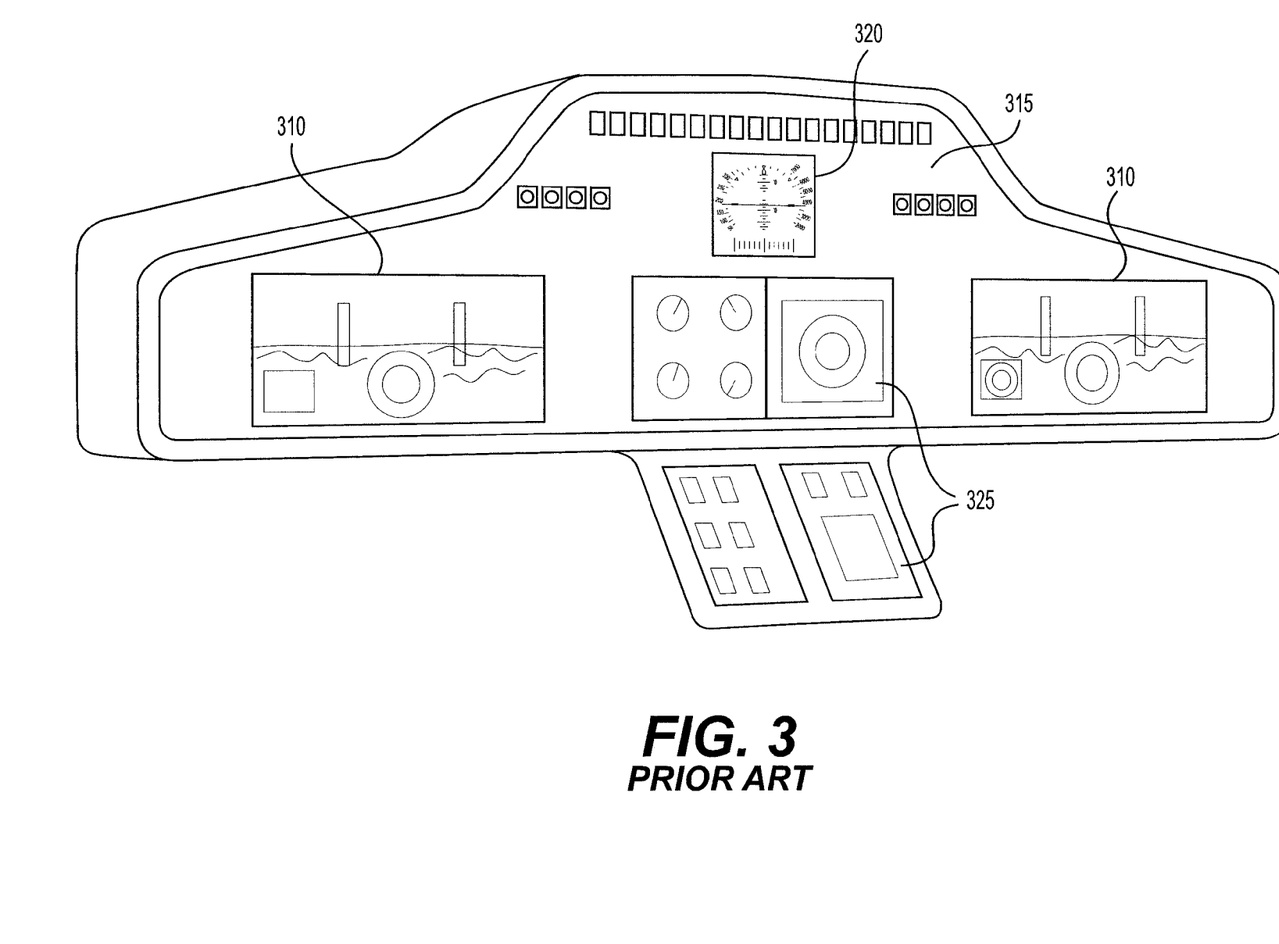
FIG. 3 is a perspective view of a prior art electronic display system for an aircraft.

With conventional panel arrangements having dual displays 310 such as those shown in FIG. 3, the standby display 320 is located on the panel 315. Standby instrument 320, as its name implies, provides a duplication of information already made available on the multiple electronic displays 310 and other conventional instrumentalities existing on conventional panels. It is never truly necessary unless an event occurs which disables or otherwise negatively impacts the other equipment. But even though it is rarely (sometimes never) solely relied on, the standby device 320 still fills valuable space on the panel so that it can be visible to the flight crew in the event of other failures. A central display 325 is located between the two pilots provides additional information not otherwise available on the personal electronic displays 310. The standby instrument 320 is located between the two pilots' displays 310 and provides the duplicitous flight information required by the FAA regulations and guidelines as discussed above. It is clear that personal electronic displays 310 and other conventional equipment do not provide an easy-to-use display of the total flying environment to the flight crew. Rather, the cockpit is cluttered and inefficient.

The TSIP 110 eliminates the need for personal electronic displays 310, instead providing a single display that, in embodiments, spans the width of the cockpit such that it is accessible to all members of the flight crew (e.g., pilot and co-pilot). As described in greater detail below, a standby instrument 320' may be located behind the TSIP 110 and viewed only when needed by the flight crew. This allows the cockpit to be neat, clean, and organized, void of unnecessary clutter caused by the presence of instruments that are only used in emergencies.

In order to overcome the deficiencies in these prior art systems, the type of display panel provided for use in the TSIP 110 in embodiments herein is one that, upon a state change (e.g., upon the loss of power, or upon a user "power off" selection being made) becomes at least somewhat translucent or transparent. In one embodiment, an organic light-emitting diode (OLED) display is used. As those skilled in the art are aware, OLED displays comprise a layer of organic semiconductor which is sandwiched between two electrodes. At least one of the electrodes in an OLED is transparent. The OLED used in the embodiment described herein is the type where both the outer electrode layers are transparent. This type of device is ideal for use in the standby arrangement herein disclosed, because the display is perfectly capable of presenting all the images and other video content necessary during use, but when power is lost, the display becomes translucent or transparent.

It should be noted, that although an OLED arrangement has been used herein, other display technologies could be used as a substitute for this arrangement. For example, some LCD arrangements might be used. Further, projector screens, or suspended particle displays might be employed to accomplish the objectives described. Therefore, this invention should not be limited to OLED arrangements unless otherwise specified.

While the OLED TSIP 110 is in operable condition, it is unnecessary for the standby display 320' to be accessible to the flight crew. This is because the TSIP already provides all the necessary information and visual content. Also, when the screen is active with content, it occludes what is behind it.

Figure 4:
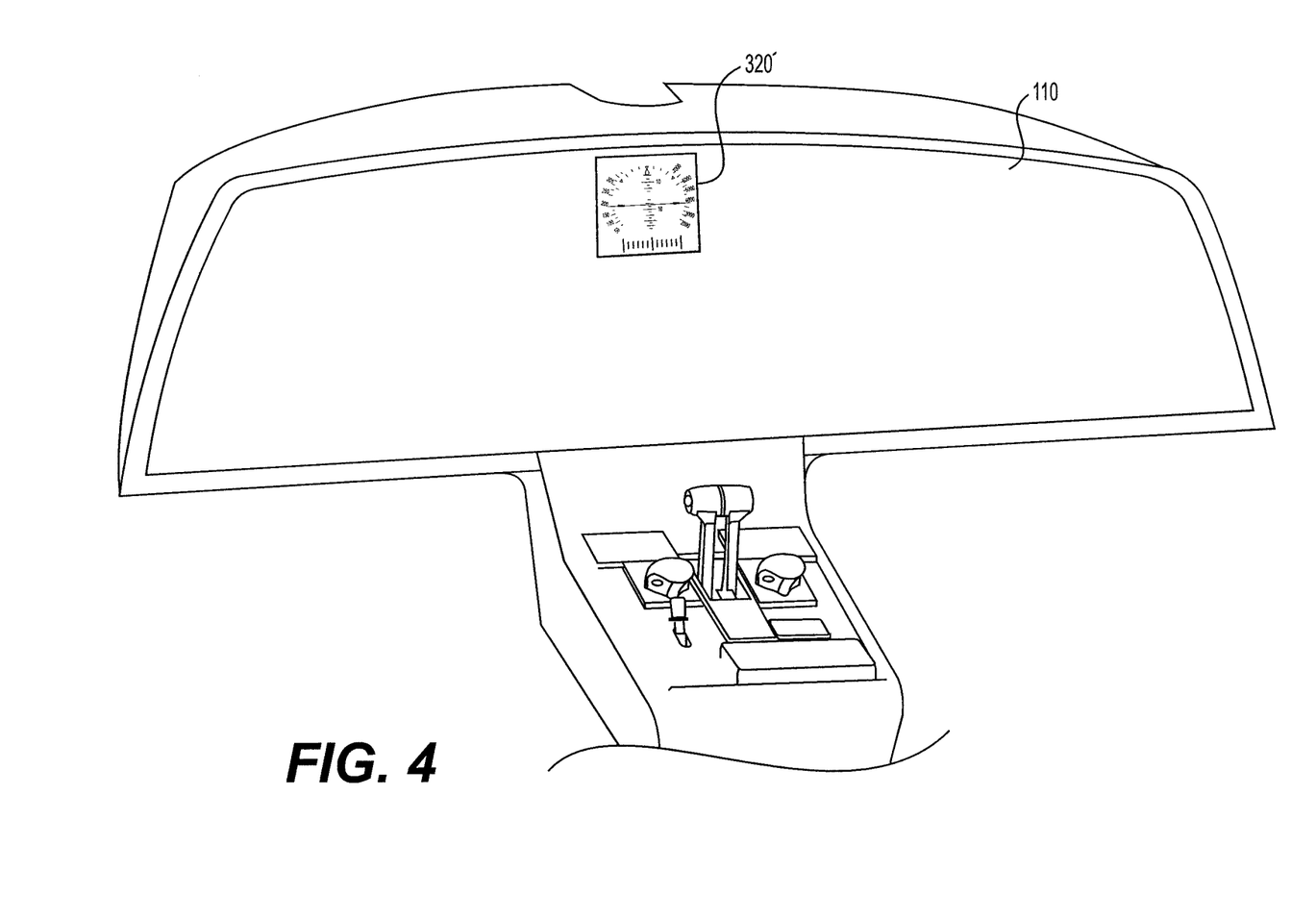
FIG. 4 is a perspective view of a standby display located behind a touch-screen instrument panel for an aircraft in accordance with an embodiment of the present invention.

The standby instrument 320', in embodiments, has been hard mounted behind the TSIP substrate 110. When power is supplied to the TSIP 110, the substrate may be entirely illuminated with images, panels, flight data, et cetera (as illustrated in FIG. 1) and the standby device 320' will be hidden (or mostly hidden) from view. However, as illustrated in FIG. 4, when power to the TSIP 110 is interrupted, the substrate becomes transparent or translucent such that the standby device 320' may be viewed through the TSIP substrate 110. In embodiments, the default state of the TSIP substrate 110 may be transparent or translucent so that the standby device 320' may be viewed automatically and immediately upon loss of power to the TSIP 110.

It may be desirable from time to time for the flight crew to see the standby device even when the TSIP 110 is fully functional. For example, during training flights, it may be beneficial for an instructor to disengage the TSIP 110 and allow a student to fly the aircraft using primarily (or exclusively) the standby device 320'. Accordingly, the TSIP 110 may be equipped with a clean user interface that allows the flight crew to purposefully "clean" the information from the TSIP substrate and view the standby device 320. In other embodiments, the computer supporting the TSIP 110 could be configured to only clear the portion of the OLED display that is directly in front of the standby instrument 320'. A clean selector may be displayed, in embodiments, as a menu item 150 which may be selected by the flight crew at any time to activate the clean user interface, thereby clearing (or partially clearing) the TSIP display 110 to reveal the standby device 320'.

The standby device 320' may be similar or identical to prior art standby devices 320 (FIG. 3) in providing attitude, airspeed, and altitude information to the flight crew. In the embodiment shown in the figures herein, devices 320 and 320' are both displays. It should be noted, however, that numerous other kinds of indicating devices and/or instruments might be hidden behind the TSIP as discussed herein. Thus, the scope of the claims should not be limited to the particular standby display discussed and shown. In one embodiment, standby device 320' is located at or near the center of the panel so that information provided by it is equally visible to both the pilot and the co-pilot of the aircraft when the TSIP is transparent or translucent. However, the standby device 320' could be alternatively located anywhere behind the TSIP 110 where it can be seen by the flight crew. For safety purposes, the standby device 320' is designed to operate independently from the TSIP 110, and may therefore has a separate power source (e.g., connected to an independent battery backup). It is thus intended that the standby device 320' be fully operational at all times during flight, regardless of the status of the TSIP.

The standby device 320' may be any sort of indicating device, but in an embodiment, it has an illuminated display, for example, an LCD, LED, or other display that is illuminated. This helps the flight crew see the display 320' through the OLED TSIP 110 when it is in backup mode and is transparent or translucent (e.g., there has been a power loss, or the power to the TSIP 110 display has been turned off intentionally).

When power is returned, however, and the OLED TSIP 110 is functional, standby device 320' will be mostly or completely hidden from view so as not to distract the flight crew from the information provided on the TSIP 110.

Although the standby device 320' is disclosed herein as being illuminated, it may alternately not be illuminated and still be seen through the transparent or translucent TSIP 110.

Further, it is possible that for different applications only portions of the OLED TSIP 110 would be powered off to expose instruments or combinations of instruments if desired.

While reference herein is made specifically to the standby device 320, it shall be understood that other emergency equipment may also be located behind the TSIP 110 and configured to be viewable when the TSIP substrate 110 is transparent or translucent.

Many different arrangements are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the claims. Not all steps listed in the various figures and description need be carried out in the specific order described. The description should not be restricted to the specific described embodiments.

What is claimed is:

1. An instrument panel system for an aircraft, comprising:
   a touch-screen information panel display configured to interface with aircraft systems through a computing system; and
   a standby instrument hard mounted in a cockpit of the aircraft, the standby instrument being behind, and facing a backside of a portion of the information panel display;
   wherein:
      the standby instrument is powered separately from the information panel display and regularly provides updated information;
      the standby instrument is at least partially hidden from view when the information panel display is in a powered state;
      the standby instrument being viewable when the portion of the information panel display is cleared; and
      the standby instrument being viewable through the portion when the information panel display is in an unpowered state.

2. The system of claim 1, wherein the information panel display is one of transparent and translucent in the unpowered state.

3. The system of claim 1, wherein the information panel display is an OLED display.

4. The system of claim 1, wherein the standby instrument comprises a display, and wherein the standby instrument display is configured to illuminate through the information panel display when the information panel display is in the unpowered state.

5. The system of claim 1, wherein the information panel display is cleared as a result of one of:
   i. a loss of electrical power to the information panel display; and
   ii. a positive selection to disengage at least a portion of the information panel display.

6. The system of claim 1, wherein the touch-screen display panel is at least one of a suspended particle display, a LCD display, and a projection display.

7. The system of claim 1, wherein the portion of the information panel display is one of transparent and translucent when cleared.

8. A method comprising the steps of:
providing a display panel in a vehicle such that in a first state the panel is active, and in a second state, the panel is more transparent than when in the first state;
securing a standby instrument in the vehicle, the standby instrument being hard mounted behind the panel and facing a backside of the panel;
powering the instrument independently from the display panel for continuously providing updated information;
orienting the instrument such that the instrument can be observed through the display panel, and information learned from the instrument, when the panel is in the second state and is more transparent; and
activating the second state by a positive selection made on the panel to clear at least a portion of the display.

9. The method of claim 8, wherein the vehicle is an aircraft and wherein the panel enables interfacing with at least one mechanical or one electrical system in the aircraft.

10. The method of claim 9, further comprising the steps of:
locating the panel in an aircraft cockpit; and
causing the panel to laterally extend such that the panel spans a substantial portion of the width of the cockpit.

11. The method of claim 8, wherein the second state is created by an interruption in the power supply to the display.

12. The method of claim 8 wherein the vehicle is an aircraft, and the standby instrument displays the aircraft's attitude, altitude, and airspeed.

13. An aircraft system comprising:
an interactive display panel constructed of an organic semiconductor which is sandwiched between two electrodes, the display panel having transparency when power is lost; and
a standby instrument providing a first continually updated aircraft reading, the standby instrument being secured in the aircraft cockpit separate from the interactive display panel, the standby instrument having an independent source of electrical power and a first reading being located behind a first portion of the display panel, wherein the standby instrument is oriented such that when power to the display panel is lost or a selection is made to clear a portion of the display panel, the first reading is readable through the display panel.

14. The system of claim 13, wherein the standby instrument is centrally located behind the display panel.

15. The system of claim 13, wherein the standby instrument is an instrument from which at least one of the aircraft's attitude, altitude, and airspeed is displayed.

16. The system of claim 13, wherein the display panel is a touch screen and is arranged through a computer system to interface with a plurality of aircraft systems such that the display panel substantially takes the place of a plurality of controls utilized to interact with said plurality of aircraft systems.

17. The system of claim 13, wherein the standby instrument provides at least one additional continually updated reading, the at least one additional reading being located behind a second portion of the display panel such that when power to the display panel is lost, the additional reading is readable through the second portion of the display panel.

18. The system of claim 13, wherein the standby instrument is located behind the display panel substantially to one side of the display panel.

* * * * *